Figure 1:
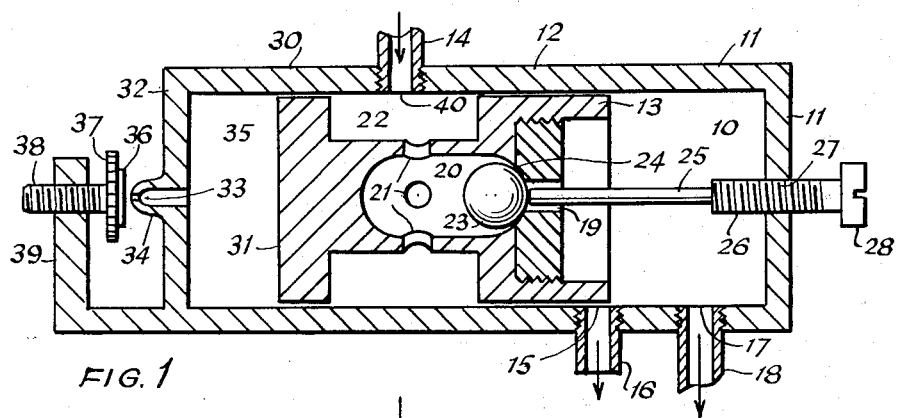

June 19, 1956  D. BEST ET AL  2,750,952
VALVE SYSTEMS FOR THE CONTROL OF FLUID PRESSURE
Filed Dec. 26, 1951  2 Sheets-Sheet 1

INVENTORS:
DENIS BEST AND
CYRIL CHARLES JONES

BY: Michael S. Striker

United States Patent Office 2,750,952
Patented June 19, 1956

2,750,952

VALVE SYSTEMS FOR THE CONTROL OF
FLUID PRESSURE

Denis Best and Cyril Charles Jones, Hollinwood, England, assignors to Ferranti Limited, Hollinwood, England Application December 26, 1951, Serial No. 263,204

Claims priority, application Great Britain
December 27, 1950

12 Claims. (Cl. 137—116.3)

This invention relates to valve systems for the control of fluid pressure and specifically to valve systems of the type in which the pressure of a fluid in a delivery channel is controlled by the regulation of valves in supply and exhaust channels communicating therewith.

By "supply channel" and "delivery channel" is meant the channels connecting the valve system on the one hand to the supply source that provides, and on the other hand to the apparatus that utilizes, the fluid under pressure, and by "exhaust channel" a channel connecting the valve system to some region of comparatively low pressure, usually the atmosphere. The term "fluid" is held to include gas, vapour, or liquid.

Valve systems of this specific type will hereinafter be referred to as being of the type stated.

The usual form of a valve system of the type stated includes a vessel having three ports which respectively form part of the supply, the delivery and the exhaust channels. The supply and the exhaust ports are opened or closed as required by separate valves of some convenient kind. By closing the exhaust valve and opening the supply valve the pressure in the vessel and hence in the delivery channel is increased. By closing the supply valve and opening the exhaust valve this pressure is reduced. By simultaneously regulating the two valves the pressure is maintained at approximately the desired value.

Many variations of this form of valve system exist but as far as we are aware none of them allows a fine adjustment of pressure, and in all of them the exercising of the controls, i. e. the simultaneous regulation of the valves requires the employment of a not inconsiderable amount of force.

The main object of the present invention is to provide a valve system of the type stated which allows a fine adjustment of the pressure in the delivery channel.

A further object is to provide a valve system of the type stated in which the pressure of said fluid in the delivery channel is automatically maintained at a controllable desired value.

Yet another object is to provide a valve system of the type stated in which only a very small force is required to exercise the control.

A further and more specific object of the invention is to provide a valve system of the type stated in which the pressure on one side of a double piston system may be closely controlled, the pressure on the other side being the fluid delivery pressure, the piston system being adapted to move and cause to be opened an exhaust port for the fluid when the fluid delivery pressure is greater than the controlled pressure, and the piston system being adapted to move and cause to be opened a supply port for the fluid when the reverse is the case, balance being achieved when the fluid pressure is equal to the controlled pressure.

Figure 2:
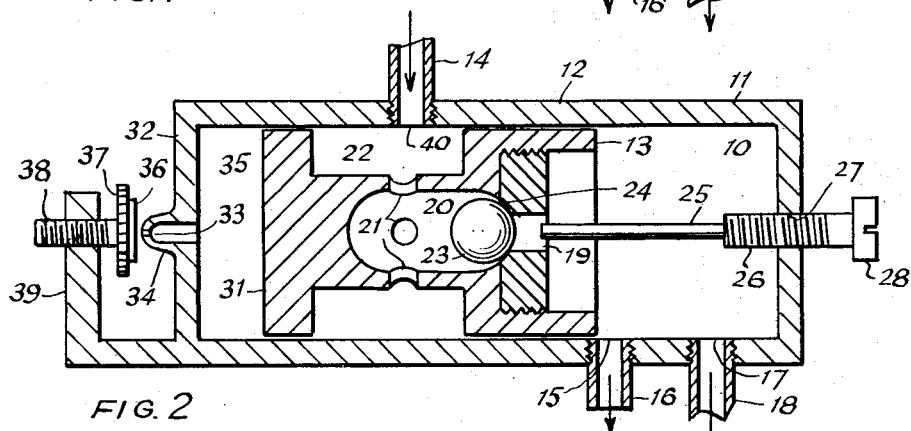
Figure 3:
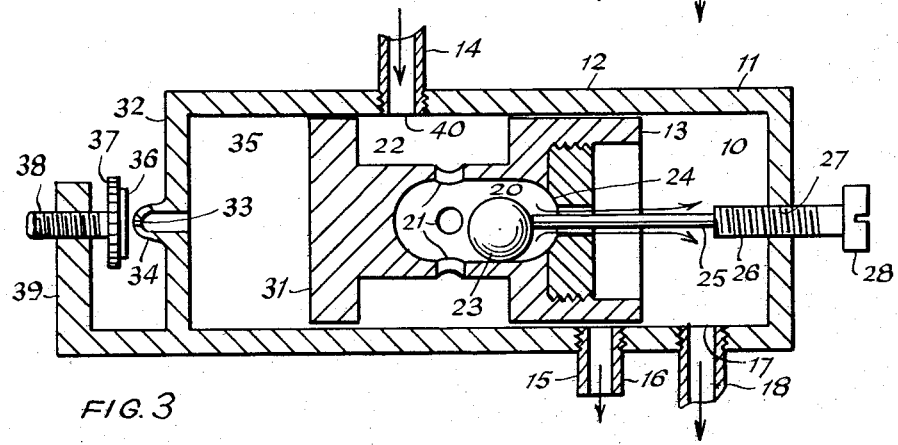
Figure 4:
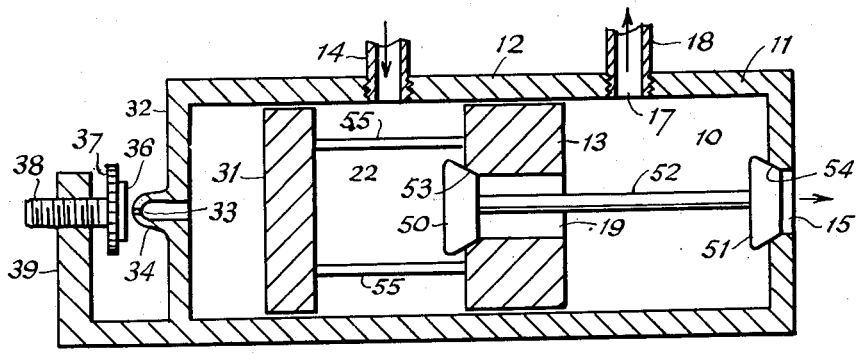
Figure 5:
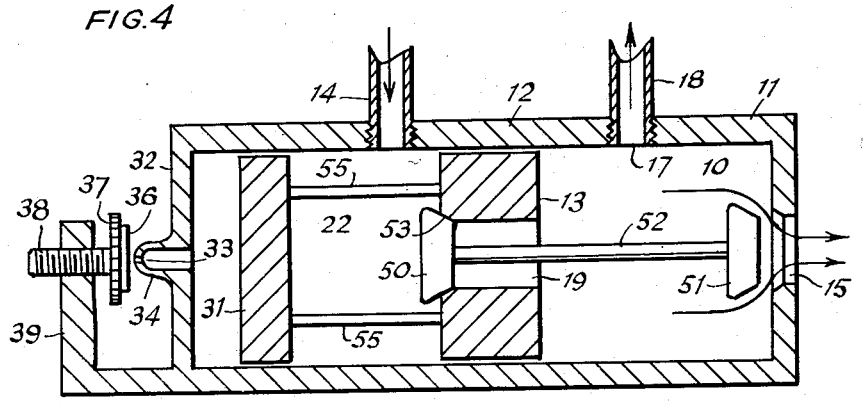
Figure 6:
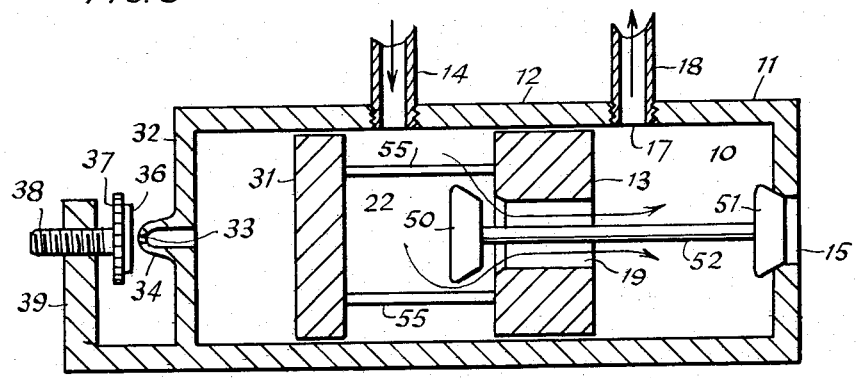
Figures 7, 8:
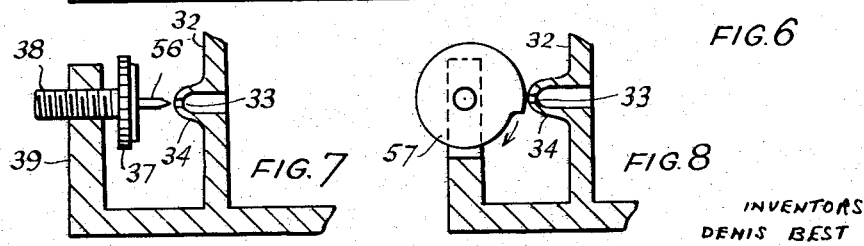

In the accompanying drawings:

Figure 1 shows in partial cross section a somewhat simplified form of one embodiment of the invention, Figures 2 and 3 illustrate the operation of the embodiment shown in Figure 1, Figure 4 shows in cross section a somewhat simplified form of another embodiment of the invention, Figures 5 and 6 illustrate the operation of the embodiment shown in Figure 4, and Figures 7 and 8 are detail views showing modifications applicable to the embodiment of Figures 1 to 6.

In carrying out the invention according to one form by way of example a valve system for the control of the air pressure in certain servo apparatus comprises a vessel 10 (see Fig. 1) having metal walls 11 a part of which vessel consists of a cylinder 12 having a closely-fitting piston 13. The end of cylinder 12 remote from vessel 10 is connected by pressure tubing 14 to a supply of compressed air. Vessel 10 contains an exhaust port 15, connected to a region of comparatively low pressure, e. g. the atmosphere, by a short tube 16, and the delivery port 17, connected to the servo apparatus (not shown) by pressure tubing 18.

The supply port of vessel 10 is formed by a passage 19 drilled axially through piston 13 and communicating with the supply channel by way of an enlarged passage or valve chamber 20 having apertures 21 opening into the space 22 behind the piston. Inside valve chamber 20 is a movable valve member in the form of a steel ball 23 which when the piston is in the position shown is urged by the pressure of the air from the supply into engagement with a seating 24 located across the supply port 19. The ball and the seating constitute the supply valve, which is of course closed when these two components are in engagement.

Associated with the supply valve is valve-opening means in the form of an elongated member or rod 25 carried by a screwed portion 26 mounted in a threaded aperture 27 in a part of wall 11. The outside end of threaded portion 26 has a screw head 28 by means of which it can be rotated. By rotation of the head 28, therefore, the axial position with respect to cylinder 12 of the free end of rod 25 is adjustable. In the position depicted in Figure 1, the free end of the rod is just in contact with the ball 23, the piston being in the datum position above referred to.

The exhaust port 15 is controlled by a movable member which in this example forms part of piston 13 but may alternatively be merely carried by the piston. The exhaust valve is thus a slide valve formed by the co-operation of the piston and the port. With the piston in the datum position shown the piston just covers the port and the valve is closed.

With the arrangement so far described it will be seen that any movement of the piston towards the supply side of the datum position—that is, to the left as depicted—opens the exhaust valve by causing the piston to uncover the supply port 15, but maintains the supply port closed, since the ball 23, being thus withdrawn from contact with rod 25, is held against the seating 24 by the air pressure. The valve system is then as shown in Figure 2. On the other hand any movement of the piston in the opposite direction from the datum position maintains the exhaust valve closed, since the exhaust port remains covered by the piston, but causes rod 25 to prevent ball 23 from moving under the force of the air in the supply channel and so displaces the ball from its seating to open the supply valve. The system is then as shown in Figure 3. The means by which piston 13 is thus operated will now be indicated.

Cylinder 12 is continued beyond the supply pipe 14 to form a second cylinder 30 arranged to be traversed by a second piston 31 linked rigidly to piston 13. The end 32 of cylinder 30 is closed except for an opening to a region of comparatively low pressure—conveniently the atmosphere—provided by a small aperture or pin-hole 33 at the end of a tube 34 which protrudes from the outside of the cylinder end 32. A slight clearance is provided between piston 31 and cylinder 30 to allow leakage of air from the supply side of the piston to the space 35 between piston 31 and the end 32 of the cylinder. The emission of air from pin-hole 33 is controlled by a control device consisting of a rubber pad 36 secured to a disc 37 at the end of a screwed shaft 38; this shaft is mounted in a threaded aperture formed in an arm 39 secured to the cylinders. Rotation of the disc adjusts the pressure with which the pad 36 engages pin-hole 33 or the clearance between the pad and the pin-hole, and hence the rate of emission of the air from space 35.

The arrangement is such that the inlet 40 from the supply pipe 14 into space 22 is situated between the two pistons in all their axial positions. The forces due to the air pressure acting on the facing ends of the two pistons are therefore always equal and balance out. The forces that determine the axial position of the combination of the two pistons are thus those acting on the outer ends of the combination, i. e. the force due to the pressure of the air in vessel 10 and the force due to the pressure of the air in space 35; as these forces clearly oppose each other it is their balance which determines the axial position of piston 13 and hence the pressure of the air in the delivery channel.

In operation, the position of the rubber pad 36 is so adjusted by rotation of the disc 37 that the air is allowed to escape through pin-hole 33 at a rate such that the pressure of the air in space 35 has the value desired for the pressure of the air in the delivery channel, as indicated by a calibrated scale (not shown) associated with disc 37. When the pressure in vessel 10 is equal to that in space 35 the forces are in balance, piston 13 occupies the datum position and both the supply and exhaust valves are closed. If the pressure in vessel 10 falls below this value the balance of forces is upset, the greater pressure in space 35 causes piston 13 to be moved to the right (see Fig. 3) from the datum position, the supply valve is opened by rod 25 forcing ball 23 away from its seating, the exhaust valve remains closed and the pressure in vessel 10 is restored. Should the pressure in vessel 10 rise above the desired value the balance is again upset but this time the greater pressure in vessel 10 causes piston 13 to be moved to the left (see Fig. 2), thereby opening the exhaust valve whilst maintaining the supply valve closed.

The pressure in the delivery channel may thus be finely adjusted by adjusting the disc 37, the control of which obviously requires very little force; once the disc has been adjusted the pressure in the delivery channel is automatically maintained at the desired value in the manner described above.

The pressure urging ball 23 towards its seating may be additionally provided by a compression spring, but usually the pressure of the air is sufficient.

The datum position of piston 13—that is to say the position in which the supply valve is closed but any movement of the piston in the direction away from the supply side will cause the valve to open—is of course determined by the axial position of rod 25. As described, the datum position coincides with a similar datum position of the piston with respect to the exhaust valve, since this valve is closed too, as depicted, but any movement of the piston in the direction towards the supply side will cause this valve to open. Hence the movement of the piston in either direction from the position depicted will cause one valve to open whilst maintaining the other closed. Such an arrangement is usually necessary when a fine degree of control is required. If however it is preferred that piston 13 should be allowed a certain extent of travel with either both valves shut or both open it is only necessary to rotate head 28 to move the free end of rod 25 axially to the right or to the left, as the case may be, from the position shown. The two datum positions then cease to coincide.

Another embodiment of the invention, using somewhat different arrangements of valves, will now be described with reference to Figure 4, in which those components already described in connection with the embodiment of Figure 1 are given similar references.

The two valves are now poppet valves with the two head members—50 of the supply valve and 51 of the exhaust valve—rigidly connected by a common system 52. This stem is guided for axial movement from the inside of vessel 10 by spiders but these are omitted from the drawing for the sake of clarity. The seating 53 of the supply valve is located across the supply port 19 in piston 13 so as to face towards the supply side of the piston, being therefore somewhat similar to seating 24 of the previously-described arrangement. The seating 54 of the exhaust valve is similarly located, facing the same way, across the exhaust port 15, which this time is located so as to be axially colinear with the seating of the supply valve. Piston 13 is rigidly linked to piston 31 by rods 55. The remaining parts of the apparatus are as before.

Piston 13 is in its datum position when it is so placed that both valves are closed, as shown in Figure 4. Any movement of the piston to the left of this position (see Fig. 5) maintains the supply valve closed (owing to the pressure of the air in space 22 acting on poppet head 50) but causes the exhaust valve to open because the left-hand movement of poppet head 50 as it follows the movement of the piston is transmitted to poppet head 51 by the common stem 52.

On the other hand any movement of piston 13 to the right of the datum position (see Fig. 6) maintains the exhaust valve closed (owing to the pressure of the air in vessel 10 acting on poppet head 51) but causes the supply valve to open because head 50 is prevented by head 51 (acting through stem 52) from following the movement of the piston.

The operation of this equipment is otherwise the same as before. If the pressure in the delivery channel falls below the desired value the piston combination moves to the right, thereby opening the supply valve; if it rises above this value the pistons move to the left, thereby opening the exhaust valve.

As before, the pressure urging the valves towards their seating may be supplemented by the force provided by a compression spring if the force provided by the fluid is insufficient.

In either of the above embodiments the control device may take a different form from that described. For example (see Figure 7), it may include a needle-like member 56 mounted in a similar manner to rubber pad 36 so that rotation of disc 37 causes the point of the needle to enter the aperture to a controllable extent; the needle may alternatively be mounted on the high-pressure side of the aperture, i. e. within space 35, though this of course is usually not so convenient. In another embodiment (see Figure 8) the needle or rubber pad is replaced by a cam 57 the surface profile of which is a single-turn spiral having a small drop. The cam is mounted for rotation on the low-pressure side of the aperture with the cam surface closely adjacent to the pin-hole so that rotation of the cam advances this surface towards the hole or withdraws the surface from the hole, according to the direction of rotation. The cam may be rotated by a micrometer control.

Many other modifications may of course be made within the scope of the invention. Other fluids than air may be used, or other forms of valve. If a rubber pad is used as the control device it need not necessarily be made to press against the aperture but may be located closely adjacent to it. The leakage means that allows the fluid to escape from space 22 into space 35 may be a small aperture through the second piston rather than a clearance between it and the second cylinder.

We claim:

1. A valve system for controlling fluid pressure, comprising, in combination, an elongated hollow member formed with a supply aperture, an exhaust port, and a delivery port; piston means in said elongated hollow member arranged for movement along the longitudinal axis of said hollow member and having a supply passage extending therethrough, said piston means dividing the interior of said hollow member into an inlet and an outlet chamber and occupying a rest position when the pressure within said outlet chamber is equal to a predetermined pressure, said supply aperture opening into said inlet chamber and said exhaust and delivery ports opening into said outlet chamber; a supply valve operatively associated with said piston means and movable between open and closed positions for opening and closing said supply passage, said supply valve being arranged in said inlet chamber in such a manner that the pressure of the fluid entering through said supply aperture tends permanently to hold said supply valve in closed position; means for automatically moving said supply valve into open position on movement of said piston means from its rest position toward said delivery port beyond a first predetermined position, thereby opening said supply passage; an exhaust valve arranged in said outlet chamber and being movable with said piston means between open and closed positions for opening and closing said exhaust port, said exhaust valve being closed when said piston means is in its rest position thereof, being automatically moved into open position on movement of said piston means from its rest position toward said supply aperture beyond a second predetermined position and being automatically returned into closed position upon returning movement of said piston means toward said delivery port into its rest position; and fluid pressure responsive means connected to said piston means for moving the latter from its rest position toward said delivery port beyond said first predetermined position when the pressure within said outlet chamber falls below said predetermined pressure, thereby opening said supply passage so as to permit the flow of fluid from said supply aperture through said supply passage into said outlet chamber, thus increasing the pressure therewithin, and also for permitting the pressure of the fluid in said outlet chamber, when the same is greater than said predetermined pressure, to move said piston means toward said supply aperture beyond said second predetermined position, thereby opening said exhaust port so as to vent excess fluid in said outlet chamber, thus decreasing the pressure therewithin, whereby the pressure within said outlet chamber is constantly maintained at said predetermined pressure.

2. A valve system for controlling fluid pressure, comprising, in combination, an elongated hollow member formed with a supply aperture, an exhaust port, and a delivery port; piston means in said elongated hollow member arranged for movement along the longitudinal axis of said hollow member and having a supply passage extending therethrough, said piston means dividing the interior of said hollow member into an inlet and an outlet chamber and occupying a rest position when the pressure within said outlet chamber is equal to a predetermined pressure, said supply aperture being arranged nearer one end of said hollow member and opening into said inlet chamber and said exhaust and delivery ports being arranged nearer the opposite end of said hollow member opening into said outlet chamber; a supply valve operatively associated with said piston means and movable between open and closed positions for opening and closing said supply passage, said supply valve being arranged in said inlet chamber in such a manner that the pressure of the fluid entering through said supply aperture tends permanently to hold said supply valve in closed position; elongated means extending from said other end of said hollow member into said supply passage for automatically moving said supply valve into open position on movement of said piston means from its rest position toward said delivery port beyond a first predetermined position, thereby opening said supply passage; an exhaust valve arranged in said outlet chamber and being movable with said piston means between open and closed positions for opening and closing said exhaust port, said exhaust valve being closed when said piston means is in its rest position thereof, being automatically moved into open position on movement of said piston means from its rest position toward said supply aperture beyond a second predetermined position and being automatically returned into closed position upon returning movement of said piston means toward said delivery port into its rest position; and fluid pressure responsive means connected to said piston means for moving the latter from its rest position toward said delivery port beyond said first predetermined position when the pressure within said outlet chamber falls below said predetermined pressure, thereby opening said supply passage so as to permit the flow of fluid from said supply aperture through said supply passage into said outlet chamber, thus increasing the pressure therewithin, and also for permitting the pressure of the fluid in said outlet chamber, when the same is greater than said predetermined pressure, to move said piston means toward said supply aperture beyond said second predetermined position, thereby opening said exhaust port so as to vent excess fluid in said outlet chamber, thus decreasing the pressure therewith, whereby the pressure within said outlet chamber is constantly maintained at said predetermined pressure.

3. A valve system for controlling fluid pressure comprising, in combination, an elongated hollow member formed with a supply aperture, an exhaust port, a delivery port, and an escape aperture; first piston means in said elongated hollow member forming an outlet chamber at one end thereof and arranged for movement along the longitudinal axis of said hollow member, and having a supply passage extending therethrough, said exhaust and delivery ports opening into said outlet chamber; a supply valve operatively associated with said first piston means and movable between open and closed positions for opening and closing said supply passage, the pressure of the fluid entering through said supply aperture permanently tending to hold said supply valve in closed position; means for automatically moving said supply valve into open position on movement of said first piston means toward said delivery port beyond a predetermined position so as to open said supply passage; an exhaust valve movable between open and closed positions for opening and closing said exhaust port, said exhaust valve being automatically moved into open position on movement of said piston means toward said supply aperture beyond a predetermined position and being automatically returned into closed position upon movement of said piston means toward said delivery port beyond said last predetermined position; second piston means in said elongated hollow member defining a second chamber at the opposite end thereof and defining an inlet chamber between said second and outlet chambers and connected to said first piston means for movement therewith, said escape aperture opening into said second chamber and said supply aperture opening into said inlet chamber; leakage means between said supply aperture and said second chamber; and control means for regulating escape of fluid from said second chamber through said escape aperture, whereby the pressure of the fluid at the delivery port is automatically controlled.

4. A valve system for controlling fluid pressure comprising, in combination, an elongated hollow member formed with a supply aperture, an exhaust port and a delivery port arranged at one end thereof, and an escape aperture at the opposite end thereof; first piston means in said elongated hollow member forming an outlet chamber at said one end thereof and arranged between said supply aperture and said ports for movement along the longitudinal axis of said hollow member, and having a supply passage extending therethrough, said exhaust and delivery ports opening into said outlet chamber; a supply valve operatively associated with said first piston means and movable between open and closed positions for opening and closing said supply passage, the pressure of the fluid entering through said supply aperture permanently tending to hold said supply valve in closed position; means for automatically moving said supply valve into open position on movement of said first piston means toward said delivery port beyond a predetermined position so as to open said supply passage; an exhaust valve movable between open and closed positions for opening and closing said exhaust port, said exhaust valve being automatically moved into open position on movement of said piston means toward said supply aperture beyond a predetermined position and being automatically returned into closed position upon movement of said piston means toward said delivery port beyond said last predetermined position; second piston means in said elongated hollow member defining a second chamber at the opposite end thereof and defining an inlet chamber between said second and outlet chambers and connected to said first piston means for movement therewith, said escape aperture opening into said second chamber and said supply aperture opening into said inlet chamber; leakage means between said supply aperture and said second chamber; and control means for regulating escape of fluid from said second chamber through said escape aperture, whereby the pressure of the fluid at the delivery port is automatically controlled.

5. A valve system for controlling fluid pressure comprising, in combination, an elongated hollow member formed with a supply aperture, an exhaust port and a delivery port arranged at one end thereof, and an escape aperture at the opposite end thereof; first piston means in said elongated hollow member forming an outlet chamber at said one end thereof and arranged between said supply aperture and said ports for movement along the longitudinal axis of said hollow member, and having a supply passage extending therethrough, said exhaust and delivery ports opening into said outlet chamber; a supply valve operatively associated with said first piston means and movable between open and closed positions for opening and closing said supply passage, the pressure of the fluid entering through said supply aperture permanently tending to hold said supply valve in closed position; elongated means extending from said one end of said hollow member into said supply passage for automatically moving said supply valve into open position on movement of said first piston means toward said delivery port beyond a predetermined position so as to open said supply passage; an exhaust valve movable between open and closed positions for opening and closing said exhaust port, said exhaust valve being automatically moved into open position on movement of said piston means toward said supply aperture beyond a predetermined position and being automatically returned into closed position upon movement of said piston means toward said delivery port beyond said last predetermined position; second piston means in said elongated hollow member defining a second chamber at the opposite end thereof and defining an inlet chamber between said second and outlet chambers and connected to said first piston means for movement therewith, said escape aperture opening into said second chamber and said supply aperture opening into said inlet chamber; leakage means between said supply aperture and said second chamber; and control means for regulating escape of fluid from said second chamber through said escape aperture, whereby the pressure of the fluid at the delivery port is automatically controlled.

6. A valve system for controlling fluid pressure comprising, in combination, an elongated hollow member formed with a supply aperture, an exhaust port and a delivery port arranged at one end thereof, and an escape aperture at the opposite end thereof; first piston means in said elongated hollow member forming an outlet chamber at said one end thereof and arranged between said supply aperture and said ports for movement along the longitudinal axis of said hollow member, and having a supply passage extending therethrough, said exhaust and delivery ports opening into said outlet chamber; a supply valve operatively associated with said first piston means and movable between open and closed positions for opening and closing said supply passage, the pressure of the fluid entering through said supply aperture permanently tending to hold said supply valve in closed position; means for automatically moving said supply valve into open position on movement of said first piston means toward said delivery port beyond a predetermined position so as to open said supply passage; an exhaust valve movable between open and closed positions for opening and closing said exhaust port, said exhaust valve being automatically moved into open position on movement of said piston means toward said supply aperture beyond a predetermined position and being automatically returned into closed position upon movement of said piston means toward said delivery port beyond said last predetermined position; second piston means in said elongated hollow member defining a second chamber at the opposite end thereof and defining an inlet chamber between said second and outlet chambers and connected to said first piston means for movement therewith, said escape aperture opening into said second chamber and said supply aperture opening into said inlet chamber; leakage means between said supply aperture and said second chamber; and adjustable control means closely adjacent said escape aperture and movable toward and away therefrom for regulating escape of fluid from said second chamber through said escape aperture, whereby the pressure of the fluid at the delivery port is automatically controlled.

7. A valve system for controlling fluid pressure comprising, in combination, an elongated hollow member formed with a supply aperture, an exhaust port and a delivery port arranged at one end thereof, and an escape aperture at the opposite end thereof; first piston means in said elongated hollow member forming an outlet chamber at said one end thereof and arranged between said supply aperture and said ports for movement along the longitudinal axis of said hollow member, and having a supply passage extending therethrough, said exhaust and delivery ports opening into said outlet chamber; a supply valve operatively associated with said first piston means and movable between open and closed positions for opening and closing said supply passage, the pressure of the fluid entering through said supply aperture permanently tending to hold said supply valve in closed position; means for automatically moving said supply valve into open position on movement of said first piston means toward said delivery port beyond a predetermined position so as to open said supply passage; an exhaust valve movable between open and closed positions for opening and closing said exhaust port, said exhaust valve being automatically moved into open position on movement of said piston means toward said supply aperture beyond a predetermined position and being automatically returned into closed position upon movement of said piston means toward said delivery port beyond said last predetermined position; second piston means in said elongated hollow member defining a second chamber at the opposite end thereof and defining an inlet chamber between said second and outlet chambers and connected to said first piston means for movement therewith, said escape aperture opening into said second chamber and said supply aperture opening into said inlet chamber, said second piston means being spaced at its periphery from said hollow member to provide for leakage of fluid between said inlet chamber and said second chamber; and control means for regulating escape of fluid from said second chamber through said escape aperture, whereby the pressure of the fluid at the delivery port is automatically controlled.

8. A valve system for controlling fluid pressure comprising, in combination, an elongated hollow member formed with a supply aperture, an exhaust port in one end thereof, a delivery port nearer said one end, and an escape aperture at the opposite end thereof; first piston means in said elongated hollow member forming an outlet chamber at said one end thereof and arranged between said supply aperture and said ports for movement along the longitudinal axis of said hollow member, and having a supply passage extending therethrough, said exhaust and delivery ports opening into said outlet chamber; a supply valve located on the side of said first piston means nearer said supply aperture and movable between open and closed positions for opening and closing said supply passage, the pressure of the fluid entering through said supply aperture permanently tending to hold said supply valve in closed position; an exhaust valve movable between open and closed positions for opening and closing said exhaust port located in said hollow member adjacent said exhaust port; a stem member connecting said supply valve with said exhaust valve, so that movement of said first piston means toward said one end beyond a predetermined position spaces said supply passage from said supply valve while said exhaust valve closes said exhaust port, and movement of said first piston means in the opposite direction beyond said predetermined position spaces said exhaust valve from said exhaust port while said supply valve closes said supply passage; second piston means in said elongated hollow member defining a second chamber at the opposite end thereof and defining an inlet chamber between said second and outlet chambers and connected to said first piston means for movement therewith, said escape aperture opening into said second chamber and said supply aperture opening into said inlet chamber, said second piston means being spaced at its periphery from said hollow member to provide for leakage of fluid between said inlet chamber and said second chamber; and control means for regulating escape of fluid from said second chamber through said escape aperture, whereby the pressure of the fluid at the delivery port is automatically controlled.

9. A valve system for controlling fluid pressure comprising, in combination, an elongated hollow member formed with a supply aperture, an exhaust port and a delivery port arranged at one end thereof, and an escape aperture at the opposite end thereof; first piston means in said elongated hollow member forming an outlet chamber at said one end thereof and arranged between said supply aperture and said ports for movement along the longitudinal axis of said hollow member, and having a supply passage extending therethrough, said exhaust and delivery ports opening into said outlet chamber; ball means adjacent said supply passage on the side of said first piston means nearer said supply aperture and movable between open and closed positions for opening and closing said supply passage, the pressure of the fluid entering through said supply aperture permanently tending to hold said supply valve in closed position; an elongated rod extending from said one end of said hollow member into said supply passage for automatically pushing said ball means away from said supply passage on movement of said first piston means toward said delivery port beyond a predetermined position, said elongated rod being adjustable axially of said hollow member; an exhaust valve for opening and closing said exhaust port forming a part of said first piston means and movable therewith between open and closed positions for opening and closing said exhaust port; second piston means in said elongated hollow member defining a second chamber at the opposite end thereof and defining an inlet chamber between said second and outlet chambers and connected to said first piston means for movement therewith, said escape aperture opening into said second chamber and said supply aperture opening into said inlet chamber, said second piston means being spaced at its periphery from said hollow member to provide for leakage of fluid between said supply aperture and said second chamber; and control means for regulating escape of fluid from said second chamber through said escape aperture, whereby the pressure of the fluid at the delivery port is automatically controlled.

10. A valve system for controlling fluid pressure comprising, in combination, an elongated hollow member formed with a supply aperture, an exhaust port and a delivery port arranged at one end thereof, and an escape aperture at the opposite end thereof; first piston means in said elongated hollow member forming an outlet chamber at said one end thereof and arranged between said supply aperture and said ports for movement along the longitudinal axis of said hollow member, and having a supply passage extending therethrough, said exhaust and delivery ports opening into said outlet chamber; a supply valve operatively associated with said first piston means and movable between open and closed positions for opening and closing said supply passage, the pressure of the fluid entering through said supply aperture permanently tending to hold said supply valve in closed position; means for automatically moving said supply valve into open position on movement of said first piston means toward said delivery port beyond a predetermined position so as to open said supply passage; an exhaust valve movable between open and closed positions for opening and closing said exhaust port, said exhaust valve being automatically moved into open position on movement of said piston means toward said supply aperture beyond a predetermined position and being automatically returned into closed position upon movement of said piston means toward said delivery port beyond said last predetermined position; second piston means in said elongated hollow member defining a second chamber at the opposite end thereof and defining an inlet chamber between said second and outlet chambers and connected to said first piston means for movement therewith, said escape aperture opening into said second chamber and said supply aperture opening into said inlet chamber; leakage means between said supply aperture and said second chamber; and a resilient disc member mounted on said hollow member closely adjacent said escape aperture and movable toward and away therefrom for regulating escape of fluid from said second chamber through said escape aperture, whereby the pressure of the fluid at the delivery port is automatically controlled.

11. A valve system for controlling fluid pressure comprising, in combination, an elongated hollow member formed with a supply aperture, an exhaust port and a delivery port arranged at one end thereof, and an escape aperture at the opposite end thereof; first piston means in said elongated hollow member forming an outlet chamber at said one end thereof and arranged between said supply aperture and said ports for movement along the longitudinal axis of said hollow member, and having a supply passage extending therethrough, said exhaust and delivery ports opening into said outlet chamber; a supply valve operatively associated with said first piston means and movable between open and closed positions for opening and closing said supply passage, the pressure of the fluid entering through said supply aperture permanently tending to hold said supply valve in closed position; means for automatically moving said supply valve into open position on movement of said first piston means toward said delivery port beyond a predetermined position so as to open said supply passage; an exhaust valve movable between open and closed positions for opening and closing said exhaust port, said exhaust valve being automatically moved into open position on movement of said piston means toward said supply aperture beyond a predetermined position and being automatically returned into closed position upon movement of said piston means toward said delivery port beyond said last predetermined position; second piston means in said elongated hollow member defining a second chamber at the opposite end thereof and defining an inlet chamber between said second and outlet chambers and connected to said first piston means for movement therewith, said escape aperture opening into said second chamber and said supply aperture opening into said inlet chamber; leakage means between said supply aperture and said second chamber; and needle valve means movable in and out of said escape aperture for regulating escape of fluid from said second chamber through said escape aperture, whereby the pressure of the fluid at the delivery port is automatically controlled.

12. A valve system for controlling fluid pressure comprising, in combination, an elongated hollow member formed with a supply aperture, an exhaust port and a delivery port arranged at one end thereof, and an escape aperture at the opposite end thereof; first piston means in said elongated hollow member forming an outlet chamber at said one end thereof and arranged between said supply aperture and said ports for movement along the longitudinal axis of said hollow member, and having a supply passage extending therethrough, said exhaust and delivery ports opening into said outlet chamber; a supply valve operatively associated with said first piston means and movable between open and closed positions for opening and closing said supply passage, the pressure of the fluid entering through said supply aperture permanently tending to hold said supply valve in closed position; means for automatically moving said supply valve into open position on movement of said first piston means toward said delivery port beyond a predetermined position so as to open said supply passage; an exhaust valve movable between open and closed positions for opening and closing said exhaust port, said exhaust valve being automatically moved into open position on movement of said piston means toward said supply aperture beyond a predetermined position and being automatically returned into closed position upon movement of said piston means toward said delivery port beyond said last predetermined position; second piston means in said elongated hollow member defining a second chamber at the opposite end thereof and defining an inlet chamber between said second and outlet chambers and connected to said first piston means for movement therewith, said escape aperture opening into said second chamber and said supply aperture opening into said inlet chamber; leakage means between said supply aperture and said second chamber; and a rotatable cam member having a cam surface of spiral profile closely adjacent said escape aperture and movable toward and away therefrom during rotation of said cam member for regulating escape of fluid from said second chamber through said escape aperture, whereby the pressure of the fluid at the delivery port is automatically controlled.

References Cited in the file of this patent

UNITED STATES PATENTS

| | | |
|---|---|---|
| 457,005 | McNeil | Aug. 4, 1891 |
| 761,651 | Bingley | June 7, 1904 |
| 2,233,818 | Matter | Mar. 4, 1941 |

FOREIGN PATENTS

| | | |
|---|---|---|
| 196,110 | Switzerland | 1938 |